United States Patent [19]

Takahashi

[11] 3,803,504

[45] Apr. 9, 1974

[54] BALANCED TYPE AMPLIFIER CIRCUIT

[75] Inventor: Toru Takahashi, Wako City, Japan

[73] Assignee: Iwatsu Electric Company, Ltd., Tokyo, Japan

[22] Filed: Nov. 9, 1971

[21] Appl. No.: 196,884

[30] Foreign Application Priority Data

Nov. 12, 1970 Japan .............................. 45-99163
Sept. 23, 1971 Japan .............................. 46-73788

[52] U.S. Cl. ................. 330/29, 330/30 D, 330/136, 330/138

[51] Int. Cl. ............................................ H03g 3/30

[58] Field of Search ......... 330/15, 29, 69, 138, 123, 330/30 D, 136

[56] References Cited

UNITED STATES PATENTS

| | | | |
|---|---|---|---|
| 3,623,143 | 11/1971 | Marshall | 330/136 X |
| 3,119,970 | 1/1964 | Thompson et al. | 330/136 X |
| 2,761,917 | 9/1956 | Aronson | 330/15 |
| 3,189,842 | 6/1965 | Quittner | 330/123 X |
| 3,428,909 | 2/1969 | Kam et al. | 330/29 X |
| 3,260,957 | 7/1966 | Kaiser et al. | 330/123 X |
| 3,353,111 | 11/1967 | Wilson | 330/69 |

FOREIGN PATENTS OR APPLICATIONS

| | | | |
|---|---|---|---|
| 732,732 | 4/1966 | Canada | 330/29 |

*Primary Examiner*—Herman Karl Saalbach
*Assistant Examiner*—James B. Mullins
*Attorney, Agent, or Firm*—Charles E. Pfund, Chittick, Thompson & Pfund

[57] ABSTRACT

In a single stage or multi-stage balanced type amplifier circuit wherein each stage comprises a pair of transistors connected to a pair of input terminals, there is provided a bias source, the input side of the bias source being connected, directly or via an amplitude comparator, to the output of the balanced type amplifier and the output side of the bias source is connected to the input side of the balanced type amplifier.

10 Claims, 10 Drawing Figures

INVENTOR

TORU TAKAHASHI

BY Charles E. Pfund ATTORNEY

INVENTOR

TORU TAKAHASHI

BY Charles E. Bruzga ATTORNEY

INVENTOR
TORU TAKAHASHI
BY [signature]
ATTORNEY

INVENTOR
TORU TAKAHASHI

BY Charles E. [signature]
ATTORNEY

INVENTOR

TORU TAKAHASHI

BY [signature]

ATTORNEY

INVENTOR

TORU TAKAHASHI

BY [signature]

ATTORNEY

INVENTOR
TORU TAKAHASHI

BY Charles E. Bford
ATTORNEYS

BALANCED TYPE AMPLIFIER CIRCUIT

BACKGROUND OF THE INVENTION

This invention relates to a balanced type amplifier circuit and more particularly to a balanced type amplifier circuit utilizing transistors wherein the amplitude is limited or the saturation of the transistors is prevented where an excessively large input is applied.

FIG. 1 shows a connection diagram of a prior art two stage balanced type amplifier circuit comprising a first stage A including npn type transistors T1 and T2. The emitter electrodes of these transistors are connected together through a resistor R1. In parallel with resistor R1 is connected a series circuit including resistors R2 and R3 with their juncture connected to a negative source V−. Further, the collector electrodes of transistors T1 and T2 are interconnected through serially connected load resistors R4 and R5, the juncture *a* therebetween being connected to a positive source V+ through a resistor R6. A pair of input terminals I1 and I2 are connected to the base electrodes of transistors T1 and T2. The output of the first stage A is applied to the input of a second stage B comprising a pair of npn type transistors T3 and T4 connected in the same manner as the transistors in the first stage A. More particularly, the base electrodes of transistors T3 and T4 are connected to the collector electrodes of transistors T1 and T2, respectively, and the emitter electrodes of transistors T3 and T4 are interconnected through serially connected resistors R7 and R8. The juncture *b* between resistors R7 and R8 is connected to the negative source V− through a resistor R9. The collector electrodes of transistors T3 and T4 are interconnected through serially connected resistors R10 and R11, and the juncture c between these resistors is connected to the positive source V+ through a resistor R12. Further, the collector electrodes of transistors T3 and T4 are connected with output terminals O1 and O2.

An input signal impressed across input terminals I1 and I2 is amplified by the first stage amplifier circuit A and the output thereof is applied across the base electrodes of transistors T3 and T4 of the second stage amplifier circuit B. The amplified output is derived out through output terminals O1 and O2.

When such a balanced type amplifier circuit is used in the deflection circuit of an oscilloscope, for example, and when the operating points of transistors T3 and T4 are selected to satsify an equation $Vce1 = Vce2 = 1/2Vcc$ under no signal condition, where $Vce1$ and $Vce2$ represent the emitter-collector voltages of transistors T3 and T4 respectively, and $Vcc$ the voltage across junctures *b* and *c*, the collector losses of transistors T3 and T4 become equal when an input signal is applied, thus decreasing to zero the temperature difference of transistors T3 and T4.

When an excessively large input is applied to the balanced amplifier circuit B with the operating points set as above described, one of the transistor T3 or T4 of the balanced amplifier circuit B is rendered OFF while at the same time the other transistor T4 or T3 is saturated. For this reason, it takes a certain interval for the circuits to restore the normal condition after disappearance of the excessive input signal.

It has been proposed to connect in parallel a pair of oppositely poled diodes D1 and D2 across the base electrodes of npn transistors T3 and T4 as shown by dotted lines in FIG. 1. When such an improved balanced type amplifier circuit is used in a vertical deflection circuit, for example, it is possible to prevent transistors in the succeeding stage from becoming saturated. However, when this balanced type amplifier circuit is used for a wide band synchroscope, the load impedance of the amplifier circuit decreases when diode D1 or D2 becomes conductive thus rendering unstable the operation of the amplifier circuit. This also renders difficult to provide satisfactory amplitude limiting.

When the operating point is selected to satisfy a condition $Vce1 = Vce2 > 1/2\ Vcc$ without using the diodes, one of the transistors T3 or T4 becomes OFF before the other transistor T4 or T3 becomes saturated so that the amplifier circuit operates as a current switching balanced type amplifier circuit whereby it becomes impossible to provide a satisfactory amplitude limiting action for the excessively large input.

When the operating point is set in this manner, upon application of the input signal the collector losses of the *npn* type transistors T3 and T4 become different thus creating a temperature differential between these transistors. For this reason, a voltage differential is resulted across the emitter and base electrodes of each transistor which is equivalent in effect to a variation of the input voltage. The temperature variation of transistors occurs with a certain time constant so that when a rectangular wave is applied as the input signal the waveform of an oscilloscope having a balanced type amplifier with its operating point set as above described will be distorted. This also requires a complicated compensation circuit. Where a vertical deflection circuit is formed by using the balanced type amplifier circuit shown in FIG. 1 without utilizing the diodes and where the circuit is constructed such that the respective stages can operate without saturation even when a signal several times as large as a signal which causes full swing of a cathode ray tube is applied, it is necessary to make very large the dynamic range of the last stage of the vertical deflection circuit. Transistors used for this purpose are required to have a large breakdown voltage and collector loss. For this reason, it is difficult to utilize transistors suitable for use in a wide band oscilloscope. FIG. 2 shows a connection diagram of a prior art three stage balanced type amplifier circuit. First and second stages A and B of this modified amplifier circuit are identical to the first and second stages A and B of the amplifier circuit shown in FIG. 1 so that corresponding elements are designated by the same reference charactors.

Third stage C also comprises a pair of *npn* type transistors T5 and T6 with their base electrodes connected to the collector electrodes of transistors T3 and T4, respectively. The emitter electrodes of transistors T5 and T6 are connected together through serially connected resistors R13 and R14 and the juncture *d* between these resistors is connected to the negative source V− through a resistor R15. The collector electrodes of transistors T5 and T6 are interconnected through serially connected resistors R16 and R17, the juncture *e* therebetween being connected to the positive source V+ through a resistor R18. The collector electrodes of transistors T5 and T6 are connected to the output terminals O1 and O2, respectively.

Considering the combination of the second and third stages B and C when the operating point is selected to satisfy conditions $Vce1 = Vce2 > 1/2\ Vcc$ and $Vce5 =$ $Vce6 = 1/2\ V'cc$ under no signal condition, where $Vce5$ and $Vce6$ represent emitter-collector voltages of transistors T5 and T6 respectively, and $V'cc$ represents the voltage across junctures *d* and *e*, then transistors T3 and T4 will not become saturated even when an excessively large input signal is applied. Moreover, the limiting effect of transistors T3 and T4 is effective to prevent transistors T5 and T6 from becoming saturated.

However, in order to positively render OFF transistor T3 or T4 before transistors T5 and T6 become saturated, it is necessary to reduce the operating current of transistors T3 and T4. In a wide band synchroscope, high frequency transistors are used as the transistors T1 through T6. But since the cut off frequency of a transistor is related to its operating current, when transistors T3 and T4 are operated at a small operating current, transistors T3 and T4 might be operated at a small cut off frequency.

On the other hand, when the operating point is set to satisfy the conditions; $Vce1 = Vce2 > 1/2\ Vcc$ and $Vce5 = Vce6 > 1/2\ V'cc$, transistors T3 through T6 will never be saturated and it becomes possible to select an operating current at a high cut off frequency. However, stages B and C generate waveform distortion due to thermal unbalance and it becomes necessary to use an extremely complicated circuit for compensating such distortion. Further, since the characteristics of the transistors and elements of the compensating circuit are not equal it becomes impossible to provide perfect compensation with a compensation circuit having fixed constants.

SUMMARY OF THE INVENTION

It is an object to this invention to provide an improved balanced type amplifier circuit which can operate stably without limiting the amplitude where an excessively large input is applied.

A further object of this invention is provide an improved balanced type amplifier circuit which does not cause a distortion of the waveform.

Another object of this invention is to provide a balanced type amplifier circuit wherein the dynamic range of succeeding stages can be made small.

Still another object of this invention is to provide a new and improved balanced type amplifier circuit which can be used with advantages for the vertical deflection circuit of an oscilloscope of wide band for displaying waveforms at a high fidelity on the screen thereof.

According to one aspect of this invention, there is provided a balanced type amplifier circuit of the type including a pair of transistors connected to two input terminals, respectively, characterized in that there are provided an amplitude comparator connected to the balanced type amplifier circuit and a bias source responsive to the output of the amplifier comparator and that the output of the bias source is applied to the balanced type amplifier circuit.

In accordance with another aspect of this invention there is provided a multi-stage balanced type amplifier circuit of the type wherein a plurality of stages of the balanced type amplifier circuit are connected in cascade and wherein each of the stages includes a pair of transistors connected to a pair of input terminals, characterized in that there are provided a bias source connected between the output side of a predetermined stage and a preceding stage, and means for controlling the bias source in accordance with the output signal from the predetermined stage, whereby when the input signal to the amplifier circuit exceeds a predetermined value, the bias source operates to vary the bias voltage applied to the preceding stage so as to prevent saturation of the transistors thereof.

More particularly, the transistors are of the *npn* type, the base electrodes of the transistors of each stage are connected to the collector electrodes of the transistors of the preceding stage, the emitter electrodes of the transistors of each stage are interconnected directly through a resistor, and the collector electrodes of the transistors of each stage are interconnected through a resistor. The bias source comprises a *pnp* type transistor and a *npn* type transistor, the base electrode of the *pnp* type transistor being connected to the emitter electrodes of the transistors of the predetermined stage, the collector electrode of the *pnp* type transistor being connected to the base electrode of the *npn* type transistor of the bias source and the emitter electrode of the *npn* type transistor of the bias source being connected to the base electrodes of the transistors of the preceding stage.

DESCRIPTION OF THE PREFERRED EMBODIMENTS

Figure 1:
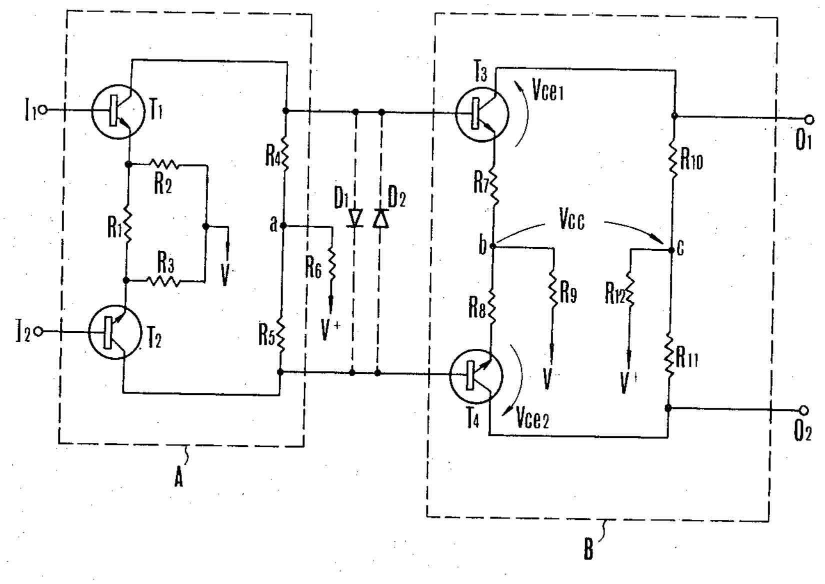
FIG. 1 PRIOR ART
FIGS. 1 and 2 show connection diagrams of prior art two stage and three stage balanced type amplifier circuits, respectively.
Figure 3:
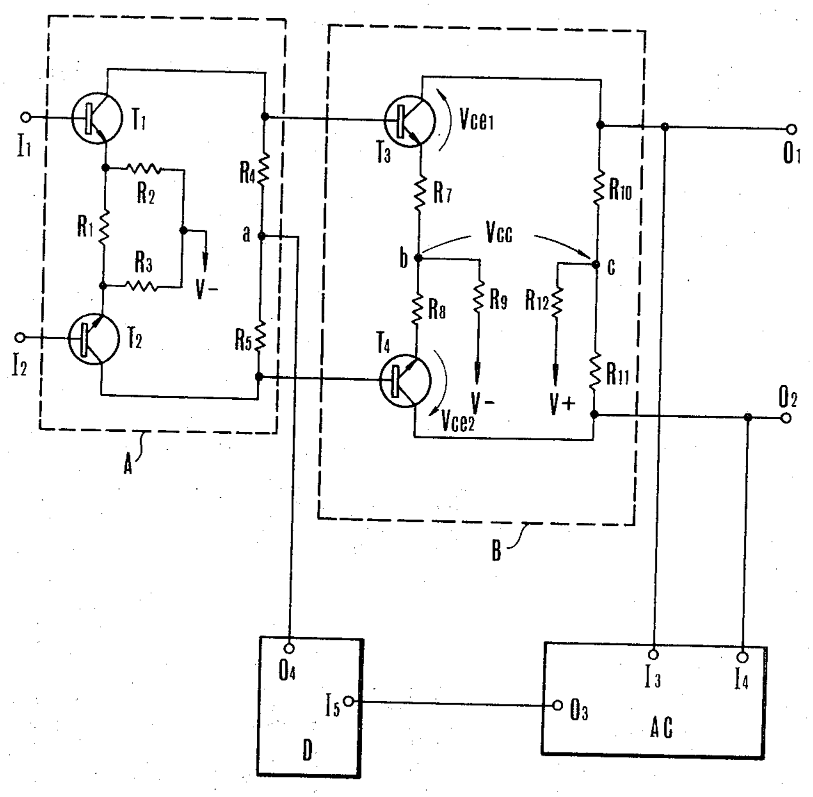
FIG. 3 shows a connection diagram of one example of the balanced type amplifier circuit embodying the invention.

Referring now to FIG. 3 of the accompanying drawing, which illustrates a preferred embodiment of this invention, the first and second stages A and B are identical to those shown in FIG. 1. According to this invention, there are provided an amplitude comparator AC with its input terminals I3 and I4 connected to the output termianals O1 and O2 of stage B and a bias source D having one input terminal or voltage control terminal I5 connected to an output terminal O3 of the amplitude comparator AC and the output terminal O4 connected to the juncture *a* between load resistors R4 and R5 on the output side of stage A.

The operating points of the *npn* transistors T3 and T4 are set to satisfy the following condition under no signal condition.

$$Vce1 = Vce2 = 1/2\ Vcc$$

where symbols $Vce1$, $Vce2$ and $Vcc$ have the same meanings as above defined.

It is assumed that an input signal is impressed across input terminals I1 and I2 of the first stage A. During an interval in which the output of the first stage A is small, the second stage B operates as a conventional balanced type amplifier circuit as in the case of FIG. 1 to provide an output to the succeeding stage through output terminals O1 and O2. Under these conditions, the bias source D operates as a conventional constant voltage source to apply a positive bias to the output side of the stage A.

On the other hand, when the output from the first stage A increases, following operation will be performed.

Figure 4:
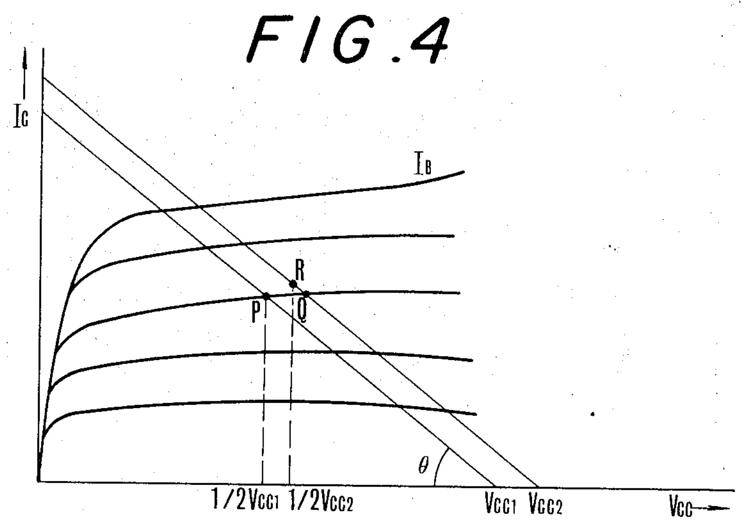
FIG. 4 is a graph showing the operating points of the transistors utilized in the circuit shown in FIG. 3.

Denoting the voltage *Vcc* between junctures *b* and *c* before the operation of the amplitude comparator AC by *Vcc*1 and that after the operation of amplitude comparator AC for varying the voltage of bias source D by *Vcc*2, during an interval wherein the output signal from the second stage B is smaller than a predetermined value, the operating point of transistor T3 or T4 will be at the middle point P of a load curve having an angle of inclination $\theta = \tan^{-1} (1/R7 + R10)$ or $\theta = \tan^{-1} (1/R8 + R11)$, as shown in FIG. 4.

However, when the amplitude comparator AC detects an excessively large output exceeding a predetermined value from the second stage B, the amplitude comparator operates to decrease by several volts the output of bias source D below the normal value which is generated when the amplitude of the output from the second stage B is smaller than the predetermined value. As a result, the bias voltage applied to the output side of the first stage A or the input side of the second stage B is decreased to increase the voltage *Vcc* across points *b* and *c*. Consequently, the operating point of transistor T3 or T4 is shifted to a point Q along a *Vcc–Ic* characteristic curve as shown in FIG. 4 where *Ic* represents the collector current and IB the base current of the transistor. Since point Q is situated to the right of the middle point P of the load curve having the angle of inclination $\theta = \tan^{-1} (1/R7 + R10)$ or $\theta = \tan^{-1} (1/R8 + R11)$, even when the input to the second stage B increases further, one of the transistor T3 or T4 is rendered OFF before the other transistor T4 or T3 becomes saturated. Under these conditions, the impedance of the circuit connected to the collector electrode of the transistor which has not been rendered OFF is increased to decrease the gain of the second stage B so that even if the input were increased further, only the output signal of small amplitude would be supplied to the succeeding stage.

Figure 8:
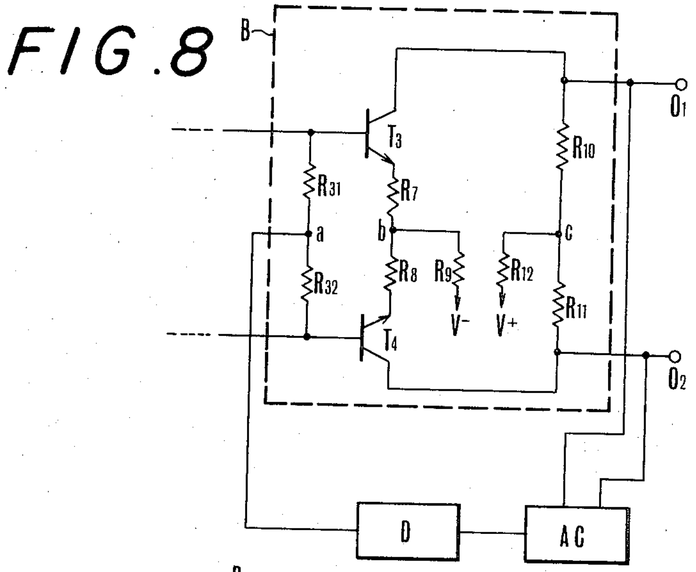

Although in this embodiment, the output from bias source D is applied to the juncture *a* between resistors R4 and R5 connected on the output side of the preceding amplifier stage A, it should be understood that it is also possible to apply the output of the bias source D directly upon the input side of the balanced type amplifier circuit. FIG. 8 shows this embodiment wherein serial resistors R31 and R32 as a bias resistor are connected across bases of transistors T3 and T4 and the juncture *a* of the resistors is supplied with the output from bias source D. The remaining elements of FIG. 8 are identical to those of FIG. 1.

Figure 9:
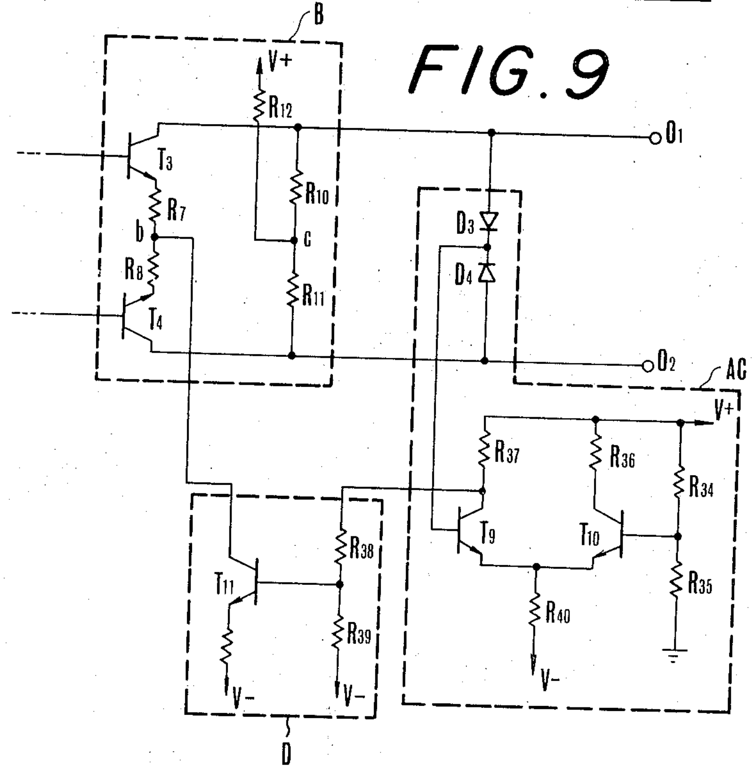

Instead of shifting the operating point of the transistor to the right of the middle point of the load curve in response to the operation of the amplitude comparator AC, it is also possible to shift the operating point to the left for the purpose of controlling the bias source D. FIG. 9 shows this embodiment, wherein T9 through T11 are transistors, R34 through R40 are resistors and D3 and D4 are diodes. In accordance with this circuit, an output from the juncture of the reversely connected diodes D3 and D4 is supplied to the base of transistor T9. This base input of transistor T9 is compared with the reference voltage supplied to the base of transistor T10 and when the reference voltage is larger than said base input of transistor T9, the base input of transistor T11 becomes decreased so as to make the voltage at the juncture *b* increase. In this embodiment the amplitude comparator AC comprises diodes D3 and D4, transistors T9 and T10 which construct an emitter-coupled type differential amplifier and resistors and the bias source D comprises a transistor 11 adapted to control the bias of the balanced amplifier.

It is of course to be understood that other types of transistors than *npn* type can also be used.

Further it should be understood that instead of detecting the amplitude component by the amplitude comparator AC connected between the output terminals O1 and O2 of the balanced amplifier B, it is also possible to detect the amplitude component at any point of the output side of the balanced amplifier where a signal variable in accordance with the input signal thereto can be obtained.

Figure 10:
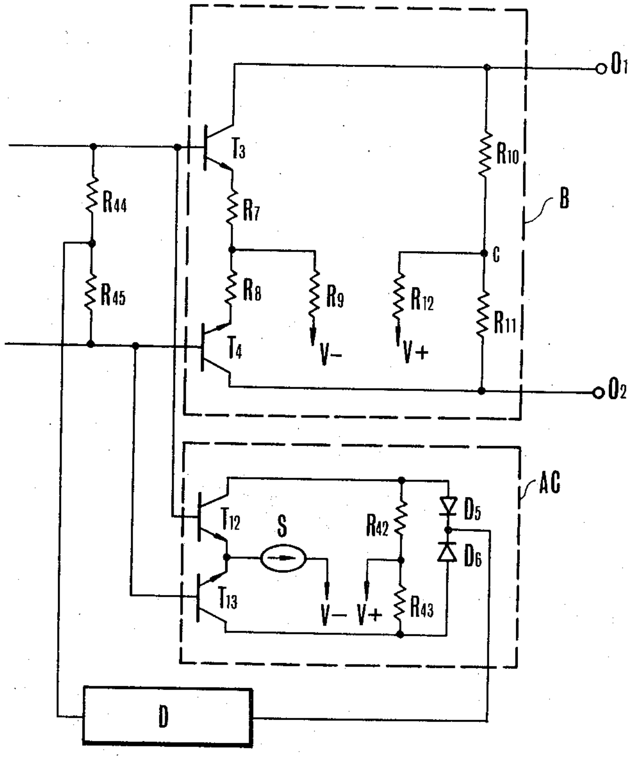

Furthermore, it should be also understood that instead of applying the signal to the amplitude comparator AC from the output side of the balanced amplifier B, it is of course permissable to supply the input signal of the balanced amplifier B to the amplitude comparator directly. An example of such circuit is shown in FIG. 10 wherein the voltage variations at the bases of transistors T3 and T4 are respectively detected by transistors T12 and T13 comprising the amplitude comparator. The emitters of these transistors T12 and T13 are connected in common to a current source S. A parallel circuit comprising serial connected resistors R42 and R43 and serial reversely connected diodes D5 and D6 is connected across the collectors of said transistors T12 and T13. The signal at the juncture of said diodes D5 and D6 is supplied to the bias source D and then the output of bias source D is supplied to the juncture of resistors R44 and R45 across the bases of transistor T3 and T4.

With this modified arrangement, it is possible to limit the amplitude where an excessively large input signal, is applied. Thus, it is possible to prevent a large input signal from being applied to the succeeding stage thus narrowing the dynamic range thereof.

When the novel balanced type amplifier circuit is applied to the vertical deflection circuit of an oscilloscope, it is possible to operate the cathode ray tube without an accompanying waveform distortion as a sag even when the bright spot may be deflected to the outside of the display screen of the tube. Moreover, in the case of such a large input signal, it is possible to limit the output to the succeeding stage to prevent the saturation of the transistors included therein.

Figure 2:
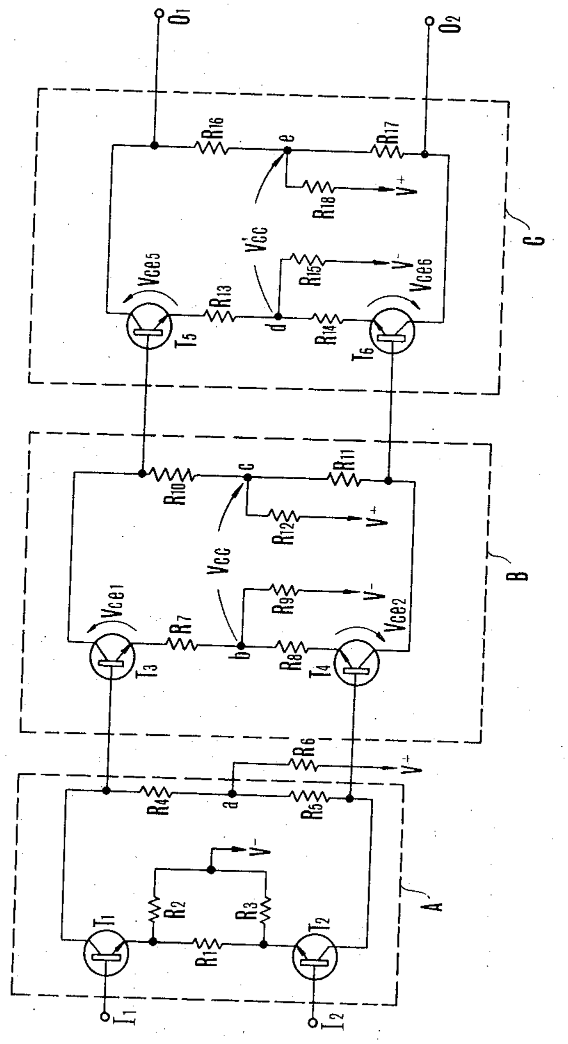
FIG. 2 PRIOR ART
Figure 5:
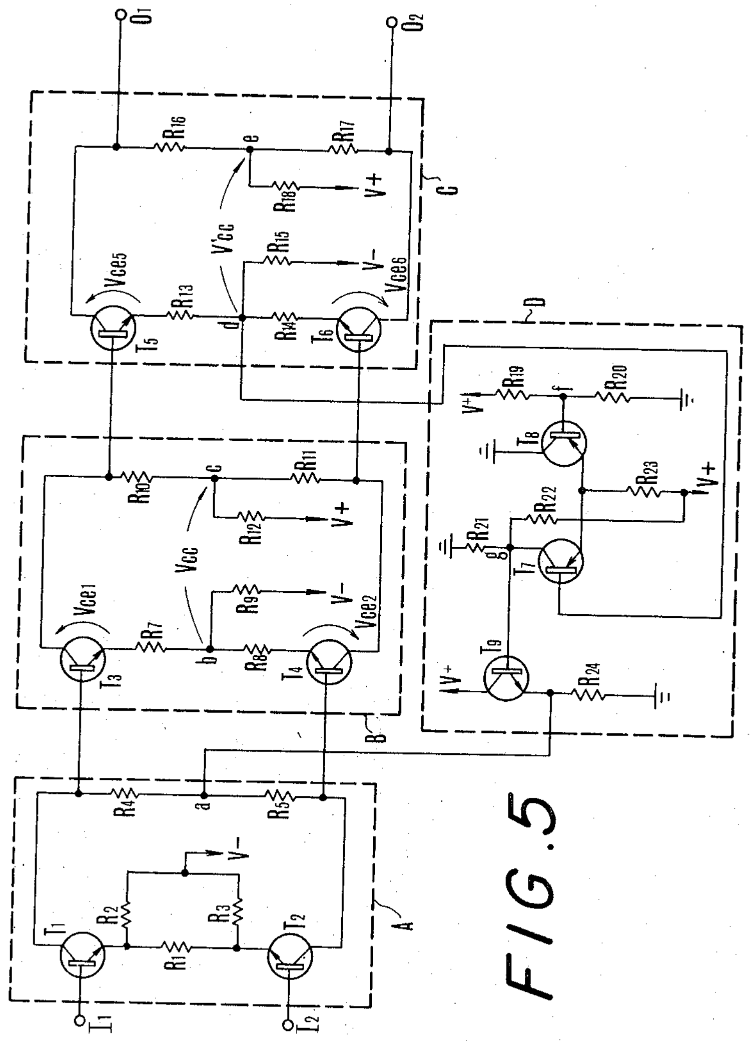
FIG. 5 is a connection diagram of a modified embodiment of the invention.

In the modified embodiment shown in FIG. 5, the invention is shown as applied to the three stage balanced type amplifier circuit shown in FIG. 2. In this embodiment the bias source D comprises two *pnp* type transistors T7 and T8 and a *npn* type transistor T9. The emitter electrodes of transistors T7 and T8 are interconnected directly and connected to the positive source V+ via a resistor R23. The collector electrode of transistor T8 is grounded directly and the base electrode of transistor T8 is connected to the juncture *f* between resistors R19 and R20 which are connected in series between the positive source V+ and the ground. The base electrode of transistor T7 is connected to the juncture *d* between the emitter feedback resistors R13 and R14 of transistors T5 and T6 of the third stage C. The collector electrode of transistor T7 is grounded through a resistor R21 and is further connected to the positive source V+ through a resistor R22. The base electrode of the *npn* type transistor T9 is connected to the collector electrode of transistor T7 and the emitter electrode of transistor T9 is connected to the juncture *a* between resistors R4 and R5 of the first stage A, thus providing a bias voltage to the collector electrodes of transistors T1 and T2 and to the base electrodes of transistors T3 and T4 of the second stage B. The collector electrode of transistor T9 is connected to the positive source V+.

Under no signal condition the operating points of *npn* type transistors T3 through T6 are set to satisfy the following conditions.

$$Vce1 = Vce2 = 1/2\ Vcc$$

$$Vce5 = Vce6 > 1/2\ V'cc$$

In this case, the potential of point *f* is selected to the slightly higher than that of point *d* so that when transistor T7 is ON, transistor T8 is maintained OFF. Accordingly, the potential of point *g* is determined by the values of resistors R21 and R22 and the value of the collector current of transistor T7, and the potential of point *a* is about 0.7V lower than that of point *g*. Under these conditions, equation $Vce1 = Vce2 = 1/2\ Vcc$ is satisfied.

Suppose now that an input signal is impressed across the input terminals of the first stage A. While the output of the first stage A is small, the second and third stages B and C operate as conventional balanced type amplifier circuits to provide an output to the succeeding stage through output terminals O1 and O2.

On the other hand, when the output of the first stage A is large, the following operation occurs.

More particularly, as the input signal increases, either transistor T5 or T6 is rendered OFF. Although the potential of point *d* is maintained at a definite value when both transistors T5 and T6 are ON, when transistor T5 or T6 is rendered OFF the potential of point *d* will increase with the increase of the input signal. When the potential of point *d* exceeds the potential of point *f*, transistor T7 is rendered OFF whereas transistor T8 ON so that the potentials of points *g* and *a* are decreased. As the potential of point *a* decreases further, the base potentials of transistors T3 and T4 are decreased, thus increasing the voltage *Vcc*. Where the value of resistor R9 is selected to be sufficiently high to provide a constant current circuit, the collector currents of transistors T3 and T4 do not vary appreaciably.

The operation of bias source D shown in FIG. 5 is identical to that of the bias source shown in FIG. 3. More particularly, when transistor T7 is rendered ON as above described the operating point of transistor T3 or T4 is at the middle point P of the load curve shown in FIG. 4. When transistor T7 is rendered OFF, the operating point of transistor T3 or T4 will be shifted to point Q. Since point Q is situated to the right of the middle point R of a load curve passing through point Q at an angle of inclination $\theta = \tan^{-1}(1/R7 + R11)$ or $\theta = \tan^{-1}(1/R8 + R11)$, a condition $Vce = 1/2\ Vcc2$ is established, where *Vce* represents the emitter-collector voltage of the transistor and *Vcc2* the value of *Vcc* when transistor T7 is OFF. Under these conditions transistor T3 or T4 becomes OFF before the other transistor T4 or T3 becomes saturated so that both transistor T3 and T4 can operate without saturation.

Where the balanced type amplifier circuit shown in FIG. 5 is applied to the vertical deflection circuit of an oscilloscope and when the circuit is set so that transistor T5 or T6 is rendered OFF after the bright spot has gone to the outside of the screen of the tube, for a signal which maintains the bright spot within the screen the condition $Vce1 = Vce2 = 1/2\ Vcc1$, will be established, where *Vcc1* represents the value of *Vcc* when transistor T7 is conductive. For this reason, distortion of the waveform is caused only by the third stage C and such distortion can be readily compensated for.

Instead of utilizing the potential of point *f* for controlling the bias voltage impressed upon the input side of the second stage B, it is also possible to use the potential at point *e*, since this potential is maintained at a constant value while both transistors T5 and T6 are conductive and beings to decrease when either transistor T5 or T6 is rendered OFF.

Figure 6:
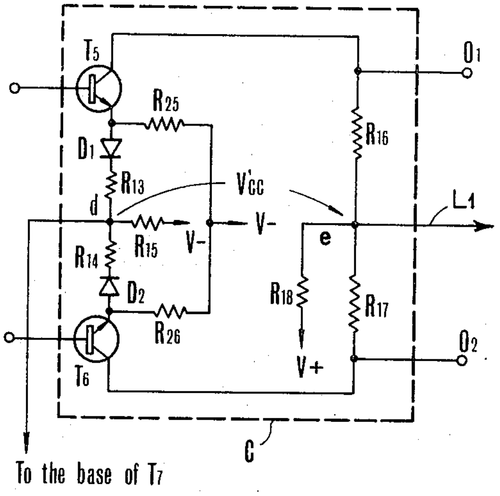
FIG. 6, FIG. 7, FIG. 8, FIG. 9 and FIG. 10 show other modified embodiments of the invention.
Figure 7:
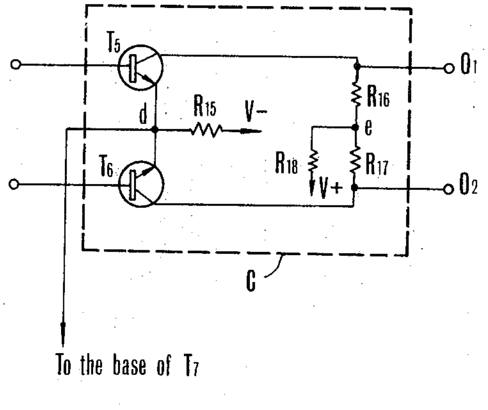

The third stage C shown in FIG. 5 can be substituted by the balanced type amplifier circuit C shown in FIG. 6 or 7.

With reference to FIG. 6, in the amplifier circuit shown therein, the anode electrode of a diode D1 is connected to the emitter electrode of transistor T5 and the cathode electrode of diode D1 is connected to one end of resistor R13. A second diode D2 is similarly connected between the emitter electrode of transistor T6 and resistor R14. A series circuit including resistors R25 and R26 is connected in parallel with the series circuit including diodes D1 and D2 and resistors R13 and R14 and the juncture between resistors R25 and R26 is connected to the negative source V−. The juncture *d* between resistors R13 and R14 is connected to the base electrode of transistor T7 in the same manner as shown in FIG. 5 and also to the negative source V− through resistor R15. Of course the base electrodes of transistors T5 and T6 are connected to the collector electrodes of transistors T3 and T5 of the second stage B.

Although in the balanced type amplifier circuit shown in FIG. 5, the operating point of the transistor is set to satisfy the condition $Vce5 = Vce2 > 1/2\ V'cc$ for the purpose of preventing the saturation of transistors T5 and T6, in the modified circuit shown in FIG. 6, the operating point is set to satisfy a condition $Vce5 = Vce6 = 1/2\ V'cc$. Then, upon increase of the input to transistor T5 and T6 diode D1 or D2 becomes OFF thus disenabling transistors T5 and T6 to act as the balanced type amplifier circuit and greatly decreasing the gain. Consequently, transistors T5 and T6 are prevented from becoming saturated. In this case it is possible to control the bias source D by the potential of point *d* for the purpose of preventing the saturation of transistors T3 and T4 of the second or preceding stage B. In the modified balanced type amplifier circuit shown in FIG. 7 which is used to substitute the third stage C shown in FIG. 5, the emitter electrodes of transistors T5 and T6 are directly interconnected at point *d* which is connected to the base electrode of transistor T7 in the same manner as in the embodiment shown in FIG. 5.

This modification enables to control the bias source D in accordance with the potential at the juncture *d*. In other respects, the circuit shown in FIG. 7 operates in the same manner as the embodiment shown in FIG. 6.

It is to be understood that instead of connecting the input side of the bias source to point *d* between the emitter electrodes of transistors T5 and T6 of the third stage it is also possible to connect the input side of the bias source over lead L1 to juncture *e* between the collector load resistors R16 and R17 of transistors T5 and T6 as is also shown in FIG. 6.

Again, for the purpose of preventing the saturation of transistors T3 and T4 of the second stage, instead of shifting the operating point of the transistor to the right with respect to the middle point R on the load curve it is also possible to shift the operating point so as to decrease the collector currents of transistors T3 and T4.

Although, in the foregoing example, the second and third stages B and C are connected in cascade, it should be understood that the invention is not limited to this connection, and that the invention can be applied to any balanced type amplifier circuit including two or more stages connected in cascade.

From the foregoing description, it will be clear that the invention provides a novel balance type amplifier circuit which can limit the amplitude or prevent saturation of transistors thus preventing application of an excessively large input signal to the succeeding stage when an input of excessive magnitude is received. When applied to the vertical deflection circuit of an oscilloscope, the novel balanced type amplifier circuit can reproduce the signal at a high fidelity on the screen of the cathode ray tube.

Although the invention has been shown and described in terms of some preferred embodiments and applications it should be understood that the invention is not limited to these particular embodiments and applications and that many changes and modifications will be obvious to one skilled in the art within the spirit and scope of the invention as defined in the appended claims.

What is claimed is:

1. In a balanced type amplifier circuit of the type including a pair of transistors connected to two input terminals, respectively, the improvement which comprises an amplitude comparator having its input side connected to the input side of said balanced type amplifier circuit and a bias source, means to connect the input side of said bias source to the output of said amplitude comparator, and means to connect the output of said bias source to said balanced type amplifier circuit, said transistors being of the *npn* type, the base electrodes of these transistors being connected to said input terminals, the collector electrodes of said transistors being connected to output terminals, and said output side of said bias source being connected to the base electrodes of said transistors.

2. The balanced type amplifier circuit according to claim 1 wherein when the output from said transistors increases beyond a predetermined value, said amplitude comparator operates to decrease the output from said bias source whereby the operating points of said transistors are shifted such that one of said transistors is rendered OFF before the other transistor becomes saturated.

3. The balanced type amplifier circuit according to claim 1 wherein the output of bias source is supplied to the juncture of serial connected resistors across the input terminals of said amplifier circuit.

4. The balanced type amplifier circuit according to claim 1 wherein said amplitude comparator comprises a pair of transistors connected respectively to the inputs of the balanced type amplifier and means to detect the voltage variation of outputs from said transistors, said bias source is supplied with the output of said means and supplies output therefrom to the juncture of serial connected resistors across the inputs of said balanced type amplifier.

5. In a multi-stage balanced type amplifier circuit of the type wherein a plurality of stages of the balanced type amplifier circuit are connected in cascade and wherein each of said stages includes a pair of transistors connected to a pair of input terminals, the improvement which comprises a bias source connected between the output side of a predetermined stage and a preceding stage, and means for controlling said bias source in accordance with the output signal from said predetermined stage, whereby when the input signal to said amplifier circuit exceeds a predetermined value, said bias source operates to vary the bias voltage applied to said preceding stage so as to prevent saturation of the transistors thereof said transistors being of the *npn* type, the base electrodes of the transistors of each stage being connected to the collector electrodes of the transistors of the preceding stage, the emitter electrodes of the transistors at each stage being connected with each other, the collector electrodes of the transistors of each stage being interconnected through a resistor, said bias source comprising a *pnp* type transistor and a *npn* type transistor, the base electrode of said *pnp* transistor being connected to the emitter electrodes of the transistors of said predetermined stage, the collector electrode of said *pnp* type transistor being connected to the base electrode of said *npn* type transistor of said bias source and the emitter electrode of said *npn* type transistor of said bias source being connected to the base electrodes of the transistors of the preceding stage.

6. The multi-stage balanced type amplifier circuit according to claim 5 wherein the base electrode of said *pnp* type transistor of said bias source is connected to the emitter electrodes of the transistors of said predetermined stage respectively through resistors which are connected in series between said emitter electrodes.

7. The multi-stage balanced type amplifier circuit according to claim 5 wherein the base electrode of said *pnp* type transistor is connected to the emitter electrodes of the transistors of said predetermined stage respectively through diodes and resistors, which are connected in series between said emitter electrodes.

8. The multi-stage balanced type amplifier circuit according to claim 5 wherein the base electrode of said *pnp* type transistor is connected directly to the emitter electrodes of the transistors of said predetermined stage.

9. An amplifier circuit comprising: a balanced type amplifier circuit including a pair of transistors connected to two input terminals, respectively, and two output terminals; an amplitude comparator comprising a pair of serial reversely connected diodes across said two output terminals, a differential amplifier comprising a pair of transistors having their emitters coupled and their bases respectively connected to the junction between said diodes and to a reference voltage source;

and a bias source having a transistor connected between the transistor of said amplitude comparator connected to said junction and the input side of said balanced type amplifier circuit to control the bias of said balanced type amplifier circuit in response to said amplitude comparator.

10. In a multi-stage balanced type amplifier circuit of the type wherein a plurality of stages of the balanced type amplifier circuit asre connected in cascade and wherein each of said stages includes a pair of transistors connected to a pair of input terminals, the improvement which comprises a bias source connected between the output side of a predetermined stage and a preceding stage, and means for controlling said bias source in accordance with the output signal from said predetermined stage, whereby when the input signal to said amplifier circuit exceeds a predetermined value, said bias source operates to vary the bias voltage applied to said preceding stage so as to prevent saturation of the transistors thereof, said transistors being of the *npn* type, the base electrodes of the transistors of each stage being connected to the collector electrodes of the transistors of the preceding stage, the emitter electrodes of the transistors of each stage being connected with ach other, the collector electrodes of the transistors of each stage being interconnected through a resistor, said bias source comprising a *pnp* type transistor and a *npn* type transistor, the base electrode of said *pnp* transistor being connected to the collector electrodes of the transistors of said predetermined stage through a resistor, the collector electrode of said *pnp* type transistor being connected to the base electrode of said *npn* type transistor of said bias source and the emitter electrode of said *npn* type transistor of said bias source being connected to the base electrodes of the transistors of the preceding stage.

* * * * *